METHOD OF PROVIDING A COPPER ARTICLE WITH A SURFACE
LAYER PROMOTING THE ADHERENCE OF ADHESIVES
Filed June 27, 1960

INVENTOR
Thomas Coe.
BY
Frank R. Trifari
AGENT

United States Patent Office 3,342,647
Patented Sept. 19, 1967

3,342,647

METHOD OF PROVIDING A COPPER ARTICLE WITH A SURFACE LAYER PROMOTING THE ADHERENCE OF ADHESIVES

Thomas Coe, Eindhoven, Netherlands, assignor to North American Philips Company, Inc., New York, N.Y., a corporation of Delaware Filed June 27, 1960, Ser. No. 38,986
Claims priority, application Netherlands, July 17, 1959, 241,397
5 Claims. (Cl. 148—6.14)

The invention relates to copper articles adapted to be attached to another article by means of an adhesive and which are provided with a layer by which the adherence of the adhesive and the heat resistance of the bond is promoted and to a method of increasing the adherence of adhesives to these articles and improving the heat resistance of the resulting bond.

The method according to the invention is particularly applicable to copper sheets which are to be attached to a plate-like carrier of a synthetic material by means of an adhesive. This adhesive may for example be a mixture of polyvinylbutyral or acrylontrile-butadiene and a resin of the phenolaldehyde type, an epoxy resin or another adhesive suitable for this purpose. The thus obtained stratified product is readily used in the manufacture of so-called printed circuits. According to otherwise known methods a part of the adhered metal sheet is etched away in a manner such as to form a certain pattern on the carrier.

In connection with this use, the following requirements are set for such stratified products:

(1) A bond which is as rigid as possible between the metal sheet and the carrier.

(2) The rigidity of this bond may not decrease when soldering to the metal sheet.

Now it was found that the adherence and the heat resistance of the bond is improved when articles are used, the surface of which against which the bond is attached, is covered with a layer which consists substantially of reaction products of copper and ammonia.

This layer may be provided on the metal surface by treating the surface at elevated temperatures with ammonia, or substances capable of splitting ammonia, in gaseous, liquid, molten or dissolved state. It has appeared that good results are obtained with organic nitrogen compounds, in particular with those which, in addition to ammonia, only split off neutral or weakly acid compounds.

In particular the following compounds have turned out to be suitable in the process according to the invention: urea, formamide and hexamethylenetetramine, the former of which compounds, urea, gives the best results.

The compounds to be considered for said purpose may for example be melted on the metal surface and decomposed by heating the metal surface or be brought into contact in a gaseous condition with the heated metal surface.

It has appeared, however, that better results are obtained when the metal surface is moistened with a solution of these compounds, for example in water. Subsequently, the metal surface is heated to a temperature exceeding the decomposition temperature of the compound in question.

The effect of the pretreatment may be improved in various manners. For example, a moistening agent, such as triethanolamine or a sulfonic acid salt of an aliphatic hydrocarbon, for example a product known under the trade name "T-pol," a product formed by the sulfation of cracked wax olefins and described in Kirk-Othmer "Encyclopedia of Chemical Technology" volume 10, page 191 may be added to the solution of the reactive compounds. It is also possible to add a small quantity of an oxidizing agent, for example ½‰ ammonium persulfate, to the solution of the reactive compounds.

The invention will now be described in greater detail and the effect of the pretreatment will be demonstrated with reference to a method of treating copper sheets with urea.

For the treatment of thin sheets, urea is preferably used in a solution in water.

The concentration of the urea in this aqueous solution may vary between wide limits and is partly dependent on the way of moistening. To obtain the effect it was found surprisingly that per $m.^2$ of copper surface only from 0.10 to maximally 0.50 gms. of urea is required. Preferably 0.25 gms. of urea is used.

"T-pol" may further be added to the solution and if necessary, ammonium persulfate. Moistening is carried out with means suitable for that purpose, for example rubber rollers. The copper sheet after moistening, is heated to a temperature of 140° C. or higher, preferably 160° C., for example in a hot air furnace or by contact heating. The layer obtained in this manner is grey in colour.

It is immaterial in the process according to the invention whether an electrolytically obtained sheet or a rolled sheet is used. In both cases the effect is obtained.

The improvement in bond-strength and solderability obtained by the treatment according to the invention shall now be explained with reference to the following tables. In these tables results are given of measurements of the bond strength of copper foil pretreated according to the invention attached to hard paper. For comparative purposes also results are given obtained with copper foil which was not pretreated. The foil used was made of electrolytically obtained copper.

In all the measurements a stratified product was used which had been obtained as follows:

The copper sheet having a thickness of 35$\mu$, pretreated (by decomposing on this surface at 160° C. for 5 minutes 0.25 gms. of urea per $m.^2$ of sheet, which was brought on this surface in a 3% aqueous solution containing "T-pol"), or not pretreated, was covered with a layer of an adhesive consisting of 80 parts by weight of copolymer (1:3) of acrylonitrile and butadiene, 100 parts by weight of cresolformaldehyde resol and 15 parts by weight of formic acid, by dissolving this mixture in 800 parts by weight of methylethylketone and spreading it on the sheet. Then the methylethylketone was evaporated from the layer of adhesive, for example by heating at 130° C. for 30 minutes.

The copper sheet provided with the adhesive in said manner was laid on top of a stack of sheets of paper impregnated with a hardenable condensate of the phenolaldehyde type. The stack was transferred to a press and then heated at a temperature of about 160° C. under a pressure of 60 atmospheres for 30 minutes.

The adherence was measured by bending a 2½ cm. wide strip of copper, part of the length of which was attached to the carrier, over 90° and then detaching 25 cms. of its length by pulling the bent end while recording the force required for the detaching.

The measurements in sixfold were performed on stratified material manufactured from pretreated and non-pretreated copper sheet.

In the following table these measuring results are summarised in the form of measured minima and maxima.

TABLE I.—DETACHING FORCE IN KILOS

| | Pretreated copper sheet | | | Non-pretreated copper sheet | |
|---|---|---|---|---|---|
| | Min. | Max. | | Min. | Max. |
| 1 | 6.2 | 6.9 | 1 | 2.6 | 3.3 |
| 2 | 6.8 | 7.7 | 2 | 2.6 | 3.3 |
| 3 | 6.5 | 7.0 | 3 | 4.2 | 4.4 |
| 4 | 6.0 | 7.9 | 4 | 4.3 | 4.7 |
| 5 | 6.7 | 7.3 | 5 | 4.4 | 5.3 |
| 6 | 6.5 | 7.2 | 6 | 3.3 | 3.5 |

From the above measured results it appears that the minimum and maximum force increases when the pretreatment is used. From the curves which were recorded in these measurements, it appeared in addition that the spreading around the average of the measurements is smaller when using pretreated copper sheet than when using non-pretreated copper sheet.

To establish the adherence after heating, test pieces were heated in oil at 250° C. for 12 seconds before measuring the detaching forces.

It appeared that the average detaching force did not change and that the spreading remained the same.

To determine the resistance against soldering on the stratified material, the following method was used.

A wire was soldered to a circular slice of sheet, the slice having a diameter of 5 mms. The soldering lasted 15 seconds and was performed with a soldering iron having a temperature of 250° C. The wire was charged until the slice detached from the sheet. Per test piece, three slices were etched, to each of which a wire was soldered.

The forces summarized in Table II were required to detach the slices.

TABLE II.—DETACHING FORCES IN KILOS

| | Pretreated copper sheet | | Non-pretreated copper sheet |
|---|---|---|---|
| 1 | 17.0-17.2-17.4 | 1 | 11.5- 7.2-11.2 |
| 2 | 15.6-13.4-17.8 | 2 | 9.5- 9.7-10.11 |
| 3 | 17.2-17.8-17.4 | 3 | 8.5-12.1- 8.2 |
| 4 | 18.2-18.3-18.4 | 4 | 11.4-10.9-11.2 |
| 5 | 20.3-16.7-16.2 | 5 | 11.7-12.3-12.4 |
| 6 | 18.5-13.6-14.2 | 6 | 8.8- 8.5- 5.8 |

The average detaching force measured according to this method amounts to 16.95 kgs. in the case of pretreated copper-sheet and to 10.61 kgs. in the case of non-pretreated copper sheet.

According to another test method, the side of the stratified material covered with copper sheet was laid on molten solder, (250° C.) for 10 seconds in pieces of 6.25 $cm.^2$.

It appeared that after this test the stratified material manufactured with pretreated copper did not show any blisters between the hard paper and the sheet. In the case of sheet material covered with non-pretreated copper sheet blisters between the hard paper and the copper sheet were formed in all the cases already after on 1 second.

The building up of the products which can be obtained according to the invention will now be described with reference to the FIGURES 1, 2 and 3.

Figure 1:
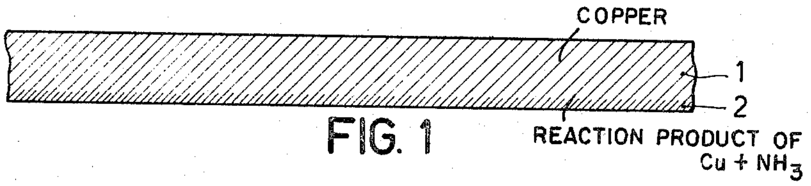
FIGURE 1 is a sectional view of a copper sheet provided with a surface layer according to the invention.

In FIGURE 1, the sheet which is treated according to the invention and in which the surface layer 2 consisting of reaction products of copper and for example urea is obtained, is indicated by 1.

Figure 2:
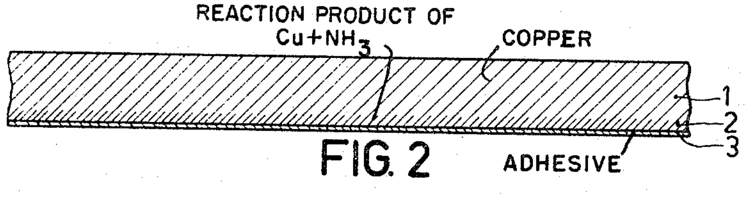
FIGURE 2 is a sectional view of a copper sheet provided with a surface layer and on top of the latter an adhesive layer.

FIGURE 2 again shows the same sheet with surface layer 2 and the layer of adhesive is indicated by 3.

According to a preferred method, the sheet provided with the layer of adhesive is laid on a stack of sheets of paper impregnated with a condensate of phenolaldehyde resin, after which the whole is combined to a stratified product at elevated temperature and under pressure. During this process, a solid bond is obtained between the sheet and the hard paper.

Figure 3:
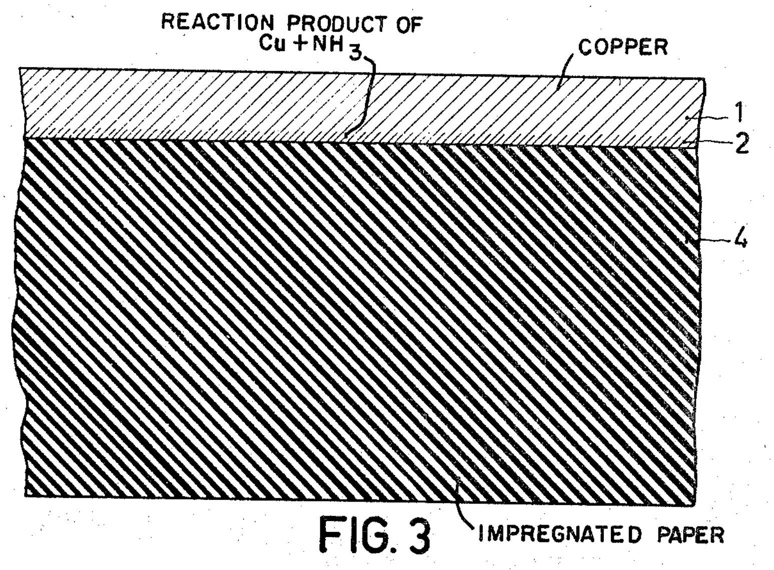
FIGURE 3 is a stratified product.

FIGURE 3 shows this final state, 1 is again the sheet and 4 the carrier.

What is claimed is:

1. A method of producing an adhesive coated copper sheet particularly suitable for laminating to other objects comprising the steps of coating a surface of said copper sheet with a solution of an organic nitrogen compound selected from the group consisting of urea, formamide and hexamethylenetetramine, heating the thus coated surface to a temperature above the decomposition temperature of said organic nitrogen compound for a time sufficient to fully decompose said organic nitrogen compound, said decomposition temperature being above the evaporation temperature of the solvent employed in said solution and then coating said surface with a synthetic resin containing adhesive.

2. The method of claim 1 wherein the solution employed is an aqueous solution of urea.

3. The method of claim 2 wherein for each square meter of surface area to be coated from 0.10 to 0.50 gram of urea are employed and wherein the coated sheet is heated to 160° C. before the synthetic resin adhesive is applied.

4. The method of claim 2 wherein a moistening agent is included in the solution of the organic nitrogen compound.

5. The method of claim 2 wherein an oxidizing agent is present in the solution of the organic nitrogen compound.

References Cited

UNITED STATES PATENTS

| | | | |
|---|---|---|---|
| 1,551,613 | 9/1925 | Pacz | 148—6.27 |
| 2,852,421 | 9/1958 | Bergstedt | 148—6.14 |
| 2,880,125 | 3/1959 | Jordon et al. | 148—23 |

FOREIGN PATENTS

| | | |
|---|---|---|
| 208,004 | 5/1957 | Australia. |

MURRAY KATZ, *Primary Examiner.*

C. F. KRAFFT, EARL M. BERGERT, RICHARD D. NEVIUS, H. L. GATEWOOD, R. S. KENDALL, *Assistant Examiners.*